United States Patent

Holmén

[11] Patent Number: 6,113,491
[45] Date of Patent: Sep. 5, 2000

[54] ROTARY CHOPPER FOR A HARVESTER COMBINE

[75] Inventor: Bengt Holmén, Skara, Sweden

[73] Assignee: Rekordverden Sweden AB, Kuänum, Sweden

[21] Appl. No.: 09/029,798

[22] PCT Filed: Sep. 6, 1996

[86] PCT No.: PCT/SE96/01086

§ 371 Date: Mar. 6, 1998

§ 102(e) Date: Mar. 6, 1998

[87] PCT Pub. No.: WO97/08937

PCT Pub. Date: Mar. 13, 1997

[30] Foreign Application Priority Data

Sep. 6, 1995 [SE] Sweden .................................. 9503059

[51] Int. Cl.[7] .................................................. A01F 12/30
[52] U.S. Cl. ............................ 460/111; 460/49; 460/112
[58] Field of Search ............................ 460/39, 42, 44, 460/111, 112, 901

[56] References Cited

U.S. PATENT DOCUMENTS

| | | | |
|---|---|---|---|
| 3,670,739 | 6/1972 | Rowland-Hill | 130/27 T |
| 4,056,107 | 11/1977 | Todd et al. | 130/27 R |
| 4,137,923 | 2/1979 | Druffel et al. | 130/27 R |
| 4,426,826 | 1/1984 | Wesselmenn | 56/13.3 |
| 4,526,180 | 7/1985 | Scott et al. | 130/27 R |
| 4,614,080 | 9/1986 | Hoepfner et al. | 56/16.6 |
| 4,646,757 | 3/1987 | Schmitt et al. | 130/27 R |
| 4,711,253 | 12/1987 | Anderson | 130/27 R |
| 4,735,216 | 4/1988 | Scott et al. | 130/27 R |
| 4,923,431 | 5/1990 | Miller et al. | 460/111 |
| 5,021,030 | 6/1991 | Halford et al. | 460/112 |
| 5,042,973 | 8/1991 | Hammarstrand | 460/112 |
| 5,120,275 | 6/1992 | Zacharias | 460/111 |
| 5,797,793 | 8/1998 | Matousek et al. | 460/111 |
| 5,833,533 | 11/1998 | Roberg | 460/112 |

FOREIGN PATENT DOCUMENTS

| | | |
|---|---|---|
| 1017705 | 12/1952 | France . |
| 0408544 | 11/1925 | Germany . |
| 1071403 | 12/1959 | Germany . |
| 0411414 | 12/1979 | Sweden . |

*Primary Examiner*—Robert E. Pezzuto
*Assistant Examiner*—Arpad Fabian Kovacs
*Attorney, Agent, or Firm*—Orum & Roth

[57] ABSTRACT

In a rotary chopper associated with a harvester combine and having a chopper rotor and counter-knives cooperating therewith in the housing of the rotary chopper, a fan is provided for supply of supplementary air at an excess pressure to the housing in order to increase the amount and the rate of the air exiting the rotary chopper and thus to improve the spreading of the comminuted material onto the ground.

4 Claims, 4 Drawing Sheets ized by numeral 1
ROTARY CHOPPER FOR A HARVESTER COMBINE

BACKGROUND OF THE INVENTION

1. Field of the Invention

The present invention relates generally to an arrangement in a cutting machine comprising cutting means disposed in a housing for comminuting material to be chopped.

In accordance with the embodiment of the invention to be described and illustrated herein and which is the one preferred at the moment, the cutting machine is a straw chopper for use in connection with a harvester combine, and wherein the cutting means comprises a chopper rotor having rotating knives and being rotatably mounted inside the housing, and counter-knives stationarily mounted inside the housing for cooperation with the rotating knives In accordance with the application referred to herein the material to be chopped consists of ordinary, dry straw, typically from wheat, barley, rye and oat, but the material may also originate from maize, sunflower or other plants comprising rather large and stiff plant parts.

2. Discussion of the Prior Act

Modern harvester combines are becoming larger and larger and their cutting tables wider and wider, considerably wider than the width of the combine proper. The cutting machine/rotary chopper connected to the combine has a width aproximately equal to that of the combine proper and it is designed to comminute or chop the material/straw after the threshing operation and to spread the material across an area which essentially corresponds to the width of the table, whereupon the material is mulched down into the soil. The spreading width of the chopper has reached its ultimate limit, which in the latest models of harvester combines having very large tables (close to 9 m) means that the material cannot be spread all the way to the side edges of the threshed string on the field being harvested. The result is an uneven distribution of the comminuted material across the threshed string (equalling the width of the table) with consequential differing cultivation conditions involving poor growth in the areas adjacent.

SUMMARY OF THE INVENTION

The object of the invention is to provide a device of the kind outlined above in order to insure improved spreading of the comminuted cut material on the ground across the entire width of the threshed string.

This object of the invention is achieved by means of an apparatus designed for supplying supplementary air to the housing in order to thus increase the amount and the rate of the air exiting from the cutting machine and in this manner to produce the desired improved spreading of the comminuted material on the ground.

DETAILED DESCRIPTION OF THE DRAWINGS

Figure 1:
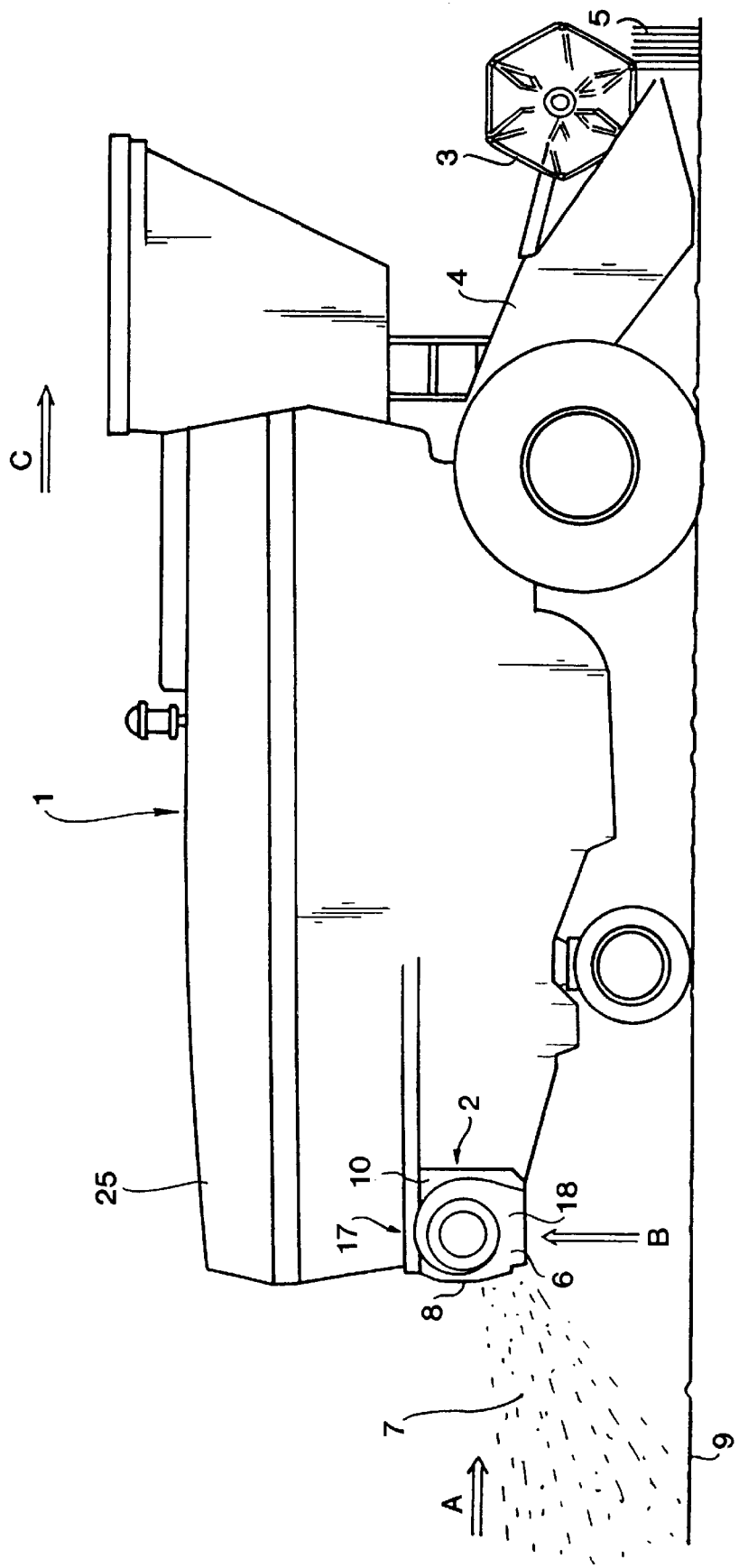
Figure 2:
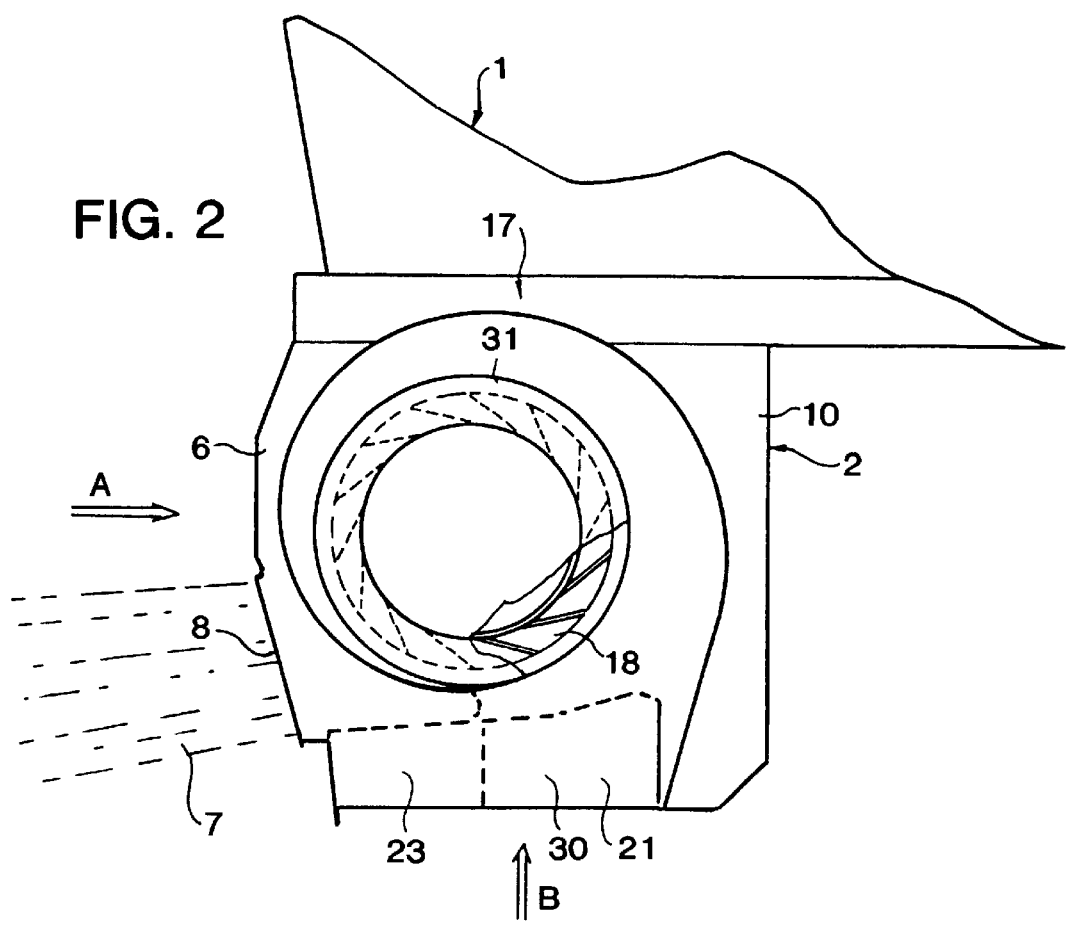
Figure 3:
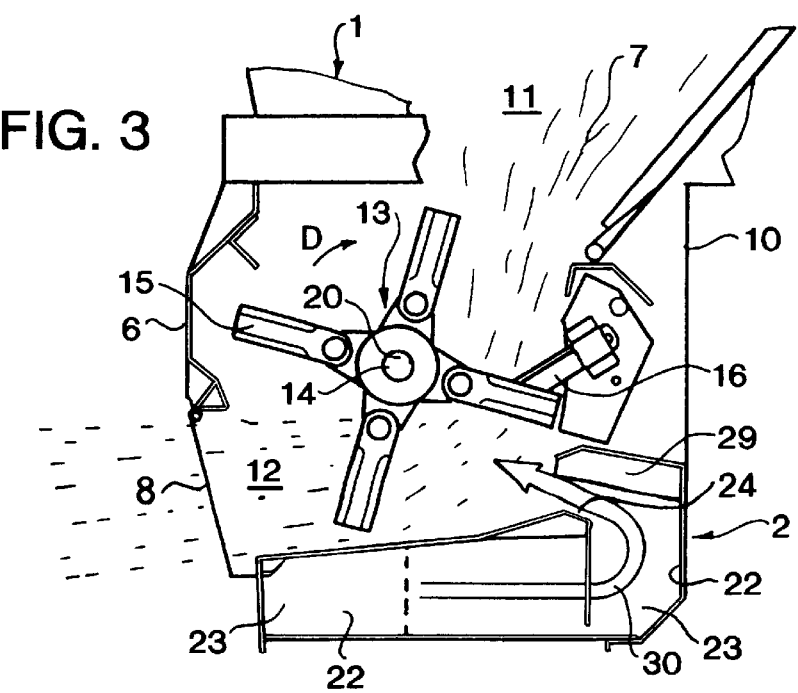
Figure 4:
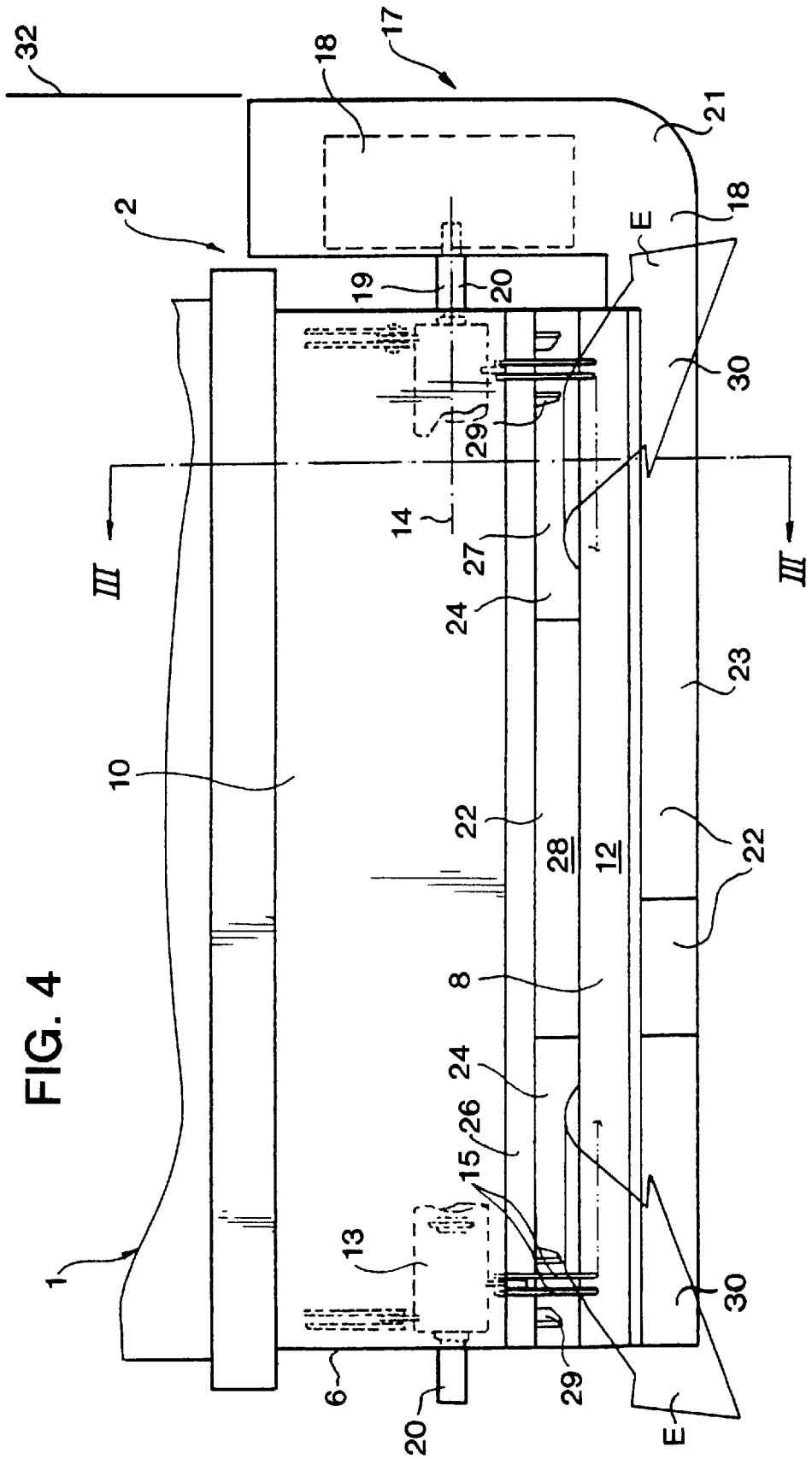
Figure 5:
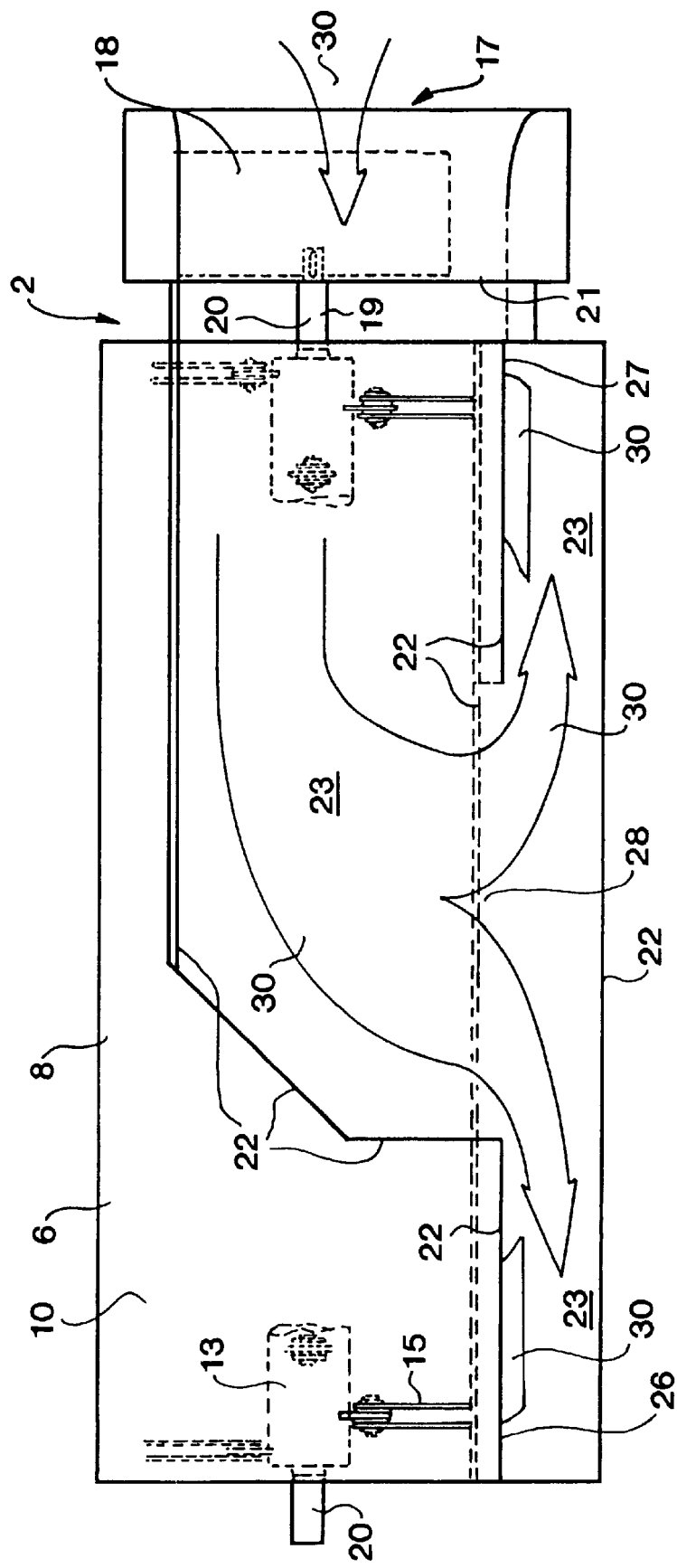

The invention is described in closer detail in the following with reference to the accompanied drawings, in which FIG. 1 in a schematically lateral view illustrates a harvester combine equipped with the device in accordance with the invention, FIG. 2 is a lateral view which on an enlarged scale illustrates the device in accordance with the invention at the rear end of the combine in accordance with FIG. 1, FIG. 3 is a cross-sectional view along line III—III of FIG. 4, FIG. 4 illustrates the device in accordance with the invention in a rear view as seen in the direction indicated by arrow A in FIGS. 1 and 2, and FIG. 5 illstrates the device in a view from below, in the direction indicated by arrow B in FIGS. 1 and 2.

DETAILED DESCRIPTION OF THE PREFERRED EMBODIMENT

The harvester combine designated generally by numeral 1 in the drawing figures, is essentially of a conventional modern design, with the exception of the cutting machine in accordance with the invention, which is designated generally by reference 2, is in the form of a rotary chopper, and comprises a pick-up-reel 3 and a cutting table 4, the width of which is considerably larger, for instance five to six times larger, than the width of combine 1 proper. The straw-feed plants 5 or the like to be harvested are cut off on the cutting table 4 and by means of conveyers, not illustrated, they are conveyed to a thresher, not illustrated, wherein the straw and the grains are separated. By way of a rocker conveyer, not shown, the straw is advanced to a rotary chopper 6 disposed at the rear end of the harvester combine 1 as seen in the direction of advancement C thereof, said rotary chopper forming the machine 2 in accordance with the invention. In this cutting machine or rotary chopper 6 the straw or the material 7 to be chopped is chopped or cut, whereupon the comminuted material is spread by means of a spreader, not shown in detail and disposed at a combine outlet 8, across an area of the ground, in this case the field 9, which area essentially corresponds to the width of the table 4, i.e. the width of the string having just been threshed or harvested.

The cutting machine or rotary chopper 6 thus is positioned in the conventional manner at the rear end of the harvester combine 1 as seen in the direction of advancement C thereof, and it comprises a housing 10 having an inlet 11 for admission of threshed but not yet chopped material 7, which as already mentioned usually originates from wheat, barley, rye and oat as well as from different kinds of oil-producing plants and maize, sunflower and the like, and an outlet 12 for ejection of the chopped and comminuted material 7.

By means of bearings, not illustrated, the chopper rotor 13 is mounted in the housing 10 of the rotary chopper 6 in such a manner that it may rotate in the direction of arrow D about an essentially horizontal pivot shaft 14. The chopper rotor 13 is rotated in the direction indicated, by means of a drive mechanism of a conventional design, not illustrated the drawings, and it comprises several juxtaposed groups, of essentially radially directed knives arranged with a central distance of approximately 25 mm. The knives 15 of the chopper rotor 13 cooperate, for the purpose of chopping and comminuting the material 7 to be cut with groups of counter-knives 16 the number of which corresponds to that of the rotating knives 15, the positions of said counter-knives being adjustable in a manner not shown or described in closer detail, according to need and wish, in order to increase or reduce the throw-flow and degree of comminutation of the different types of materials 7 mentioned above by means of example.

In order to obtain the earlier described improved spreading of the comminuted material 7 on the ground field 9 an apparatus, generally designated by 17, is provided for supply of supplementary air 30 to the housing in order to increase the amount and/or the rate of the air exiting from the cutting machine or chopper 6. This apparatus 17 may be configured in different ways but in accordance with the illustrated and preferred embodiment it comprises a fan 18 which in this case is driven by the cutting machine/rotary chopper inasmuch as it is mounted on a prolongation 19 of the drive shaft 20 of the chopper rotor 13. Obviously, the apparatus 17 may be configured differently than in the manner of a fan 18, and may for instance be a compressor, a pressure tank, etc. Obviously, the fan 18 may be actuated by other means than by the chopper rotor 13, for instance by a separate prime mover, such as an electric or hydraulic motor, not shown. The advantage of mounting the fan 18 on the prolongation 19 of the drive shaft 20 of the chopper rotor 13 is that there is no need for providing separate lines, belts and the like to the fan 18 for operation thereof, since the latter could be said to "get a free ride" from the rotor operation drive. By means of passages 23 defined by guide-plates 22 in the lower part of the chopper 6 the outlet 21 of the fan 18 is connected to an intake 24 in the housing 10, intermediate the inlet 11 and the outlet 12 thereof, more precisely immediately downstream of the counter-knives 16. The intake 24 must not necessarily be positioned in the manner illustrated in FIG. 3 but could blend into the housing 10 immediately above or upstream of the counter-knives. It is likewise possible to supply the supplementary air 30 via the inlet 11 of the housing 10, for instance from a fan mounted in the ceiling of the shroud 25 of the thresher 1 in order to force air, and also material 7, into the rotary chopper 6 via the inlet 11.

An essential inventive feature resides therein that the supplementary air 30 admitted to the housing 10 in anyone of the ways defined above, is to create a smaller or larger excess pressure in the housing 10 of the chopper 6 in order to produce the increased amount and higher speed of the air leaving the rotary chopper 6 via the outlet 12, in order to produce the desired spreading of the comminuted material 7.

The spreading efficiency is furthered additionally, in the case of the embodiment described and illustrated by the partition of the intake 24 to the housing 10 of the chopper 6 into two parts, each one of which is placed adjacent a side in the rotary chopper 6 and having a width which in the embodiment illustrated amounts to about ⅓ of the total width of the rotary chopper 6. In this manner a more powerful air blast is created into the housing 10 via the parts 26, 27 of the intake 24 in the laterial areas of the rotor chopper 6 than in the central area 28 thereof, as indicated by a flow arrow E. Even more efficient guidance of the supplementary air is obtained by providing the intake parts 26, 27 obliquely outwardly directed guide wheels 29.

To adjust the width of the spreading, the amount and the rate of the supplementary air 30 exiting from the rotary chopper 6 may be altered by varying the size of the inlet 31 to the fan 18, for instance with the aid of an axially displacable plate 32 or the like in front of the inlet of the fan 18.

The invention should not be regarded as limited to the embodiment illustrated and described herein but may be modified in several ways within the scope of the claimed protection.

What is claimed is:

1. In a rotary chopper arrangement connected to an outlet at a rear end of a harvester combine, said rotary chopper including a housing for comminuting material to be cut and a chopper rotor mounted therein for comminuting said material to be cut, said chopper rotor driven by a drive shaft, said housing having an inlet for admission of the material to be cut, an outlet for discharge of the comminuted material, and a pair of laterally spaced sides defining a width of said chopper inlet and outlet, said chopper rotor journaled at each of said side walls and including a plurality of rotating knives mounted thereon, said housing having a plurality of counter-acting knives mounted thereon so as to be complementarily matched and positioned with said plurality of rotating knives, the improvement comprising: a fan for supplying a supplementary air blast to the housing in order to increase the amount of discharged comminuted material and to achieve improved spreading of the comminuted material on the ground, said housing having an air admission intake formed therein intermediate of said housing inlet and outlet, wherein said fan is directly driven by said drive shaft of said chopper rotor and said supplementary air blast supplied to said air admission intake is adjustable according to a desired spreading width of the comminuted material.

2. The arrangement as claimed in claim 1, wherein the air admission intake is positioned immediately downstream from said counter-rotating knives.

3. The arrangement as claimed in claim 1, wherein an inlet opening to the fan includes a means for controlling an output rate of said air blast supplied to said housing 33.

4. The arrangement as claimed in claim 3, wherein the means for controlling the output rate of the fan is a displaceable plate 32 in front of said fan inlet opening.

* * * * *